April 30, 1929.  D. W. R. MORGAN  1,710,707
RADIAL FLOW CONDENSER
Filed Sept. 28, 1927  5 Sheets-Sheet 1
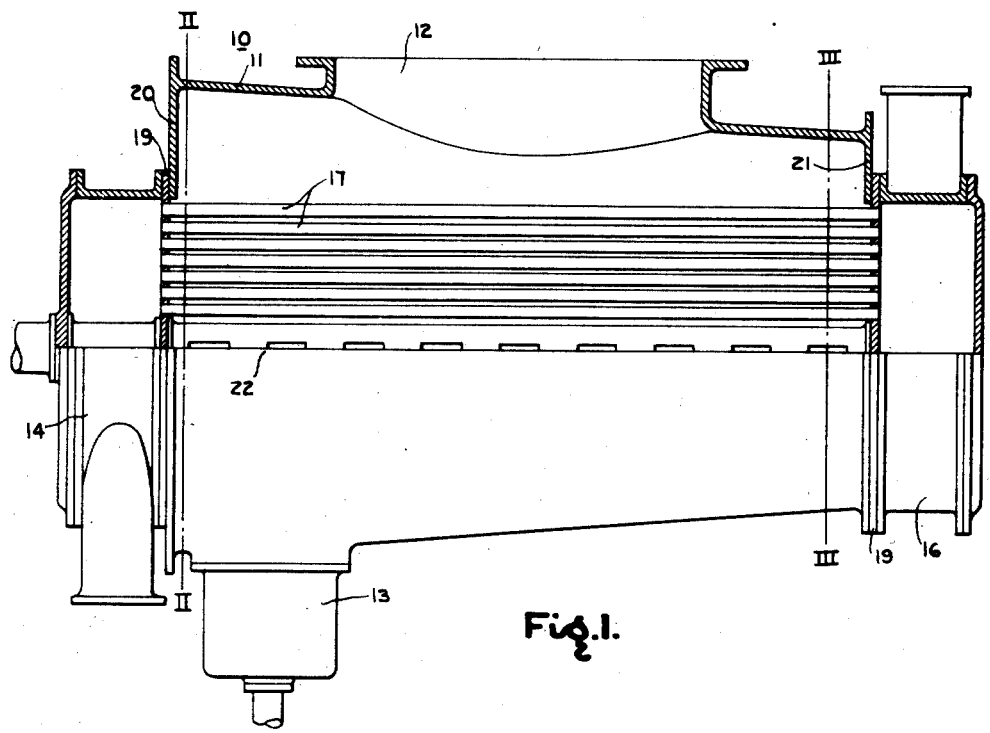
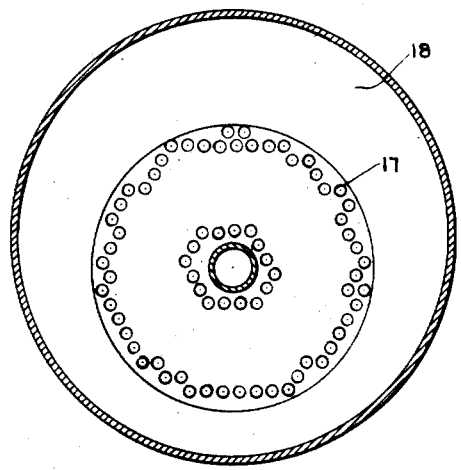
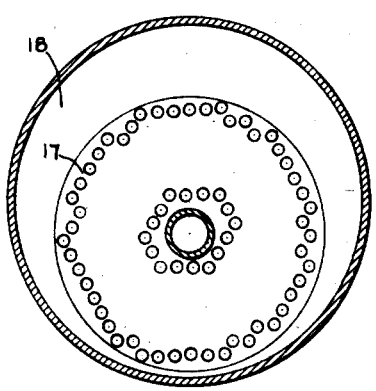
WITNESSES:
E. Lutz
INVENTOR
D.W.R. Morgan
BY
A. B. Reavis
ATTORNEY April 30, 1929.  D. W. R. MORGAN  1,710,707
RADIAL FLOW CONDENSER
Filed Sept. 28, 1927   5 Sheets-Sheet 3

WITNESSES:
E. Lutz

INVENTOR
D.W.R. Morgan
BY
A. B. Reavis
ATTORNEY

April 30, 1929.  D. W. R. MORGAN  1,710,707
RADIAL FLOW CONDENSER
Filed Sept. 28, 1927   5 Sheets-Sheet 4

WITNESSES:
E. Lutz

INVENTOR
D.W.R.Morgan
BY
A. B. Reavis
ATTORNEY

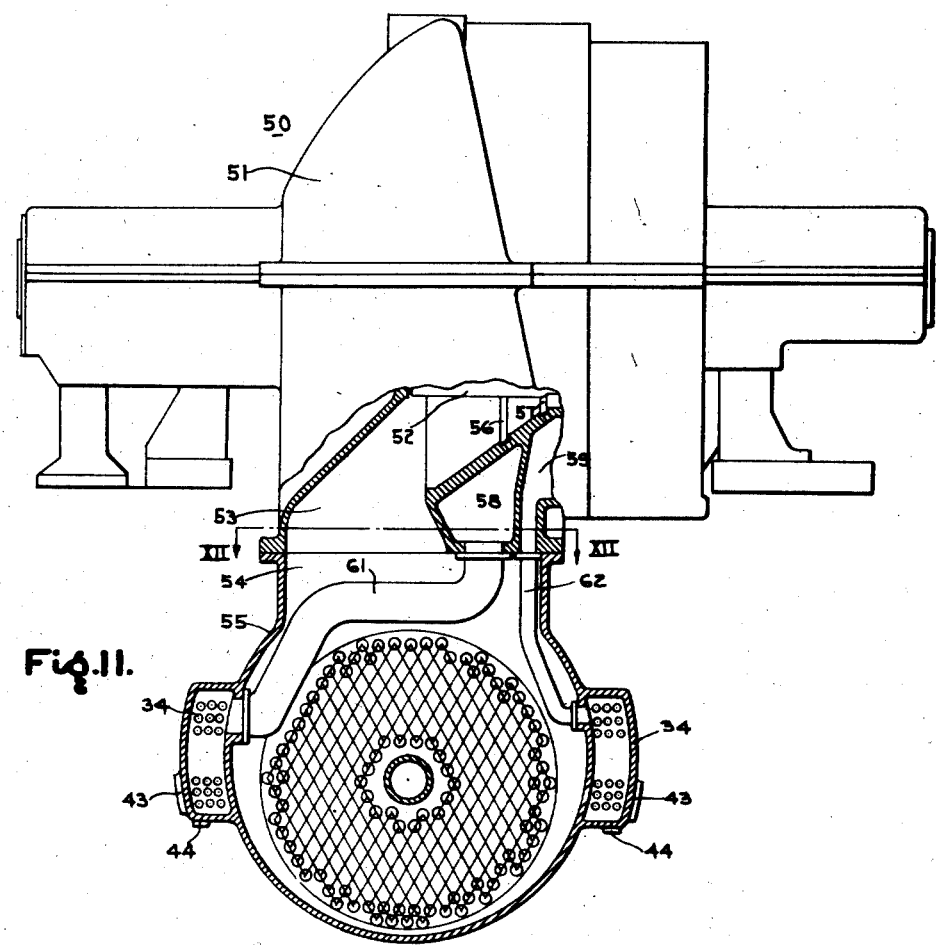
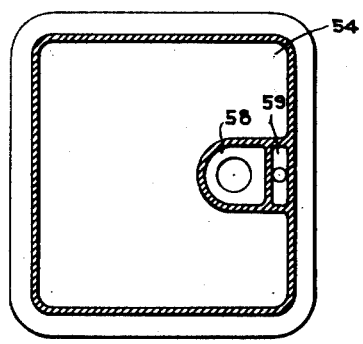
Fig.11.
Fig.12.

Patented Apr. 30, 1929.

1,710,707

UNITED STATES PATENT OFFICE.

DAVID W. R. MORGAN, OF SWARTHMORE, PENNSYLVANIA, ASSIGNOR TO WESTINGHOUSE ELECTRIC & MANUFACTURING COMPANY, A CORPORATION OF PENNSYLVANIA.

RADIAL FLOW CONDENSER.

Application filed September 28, 1927. Serial No. 222,525.

My invention relates to radial flow condensers and it has for an object, to improve the performance of condensers of this type.

In surface condensers there is a temperature gradient across the cooling surface due to the progressive heating of the circulating media as it passes through the tubes. At the inlet end of the tubes the temperature of the circulating media is the lowest and, therefore, the inlet end of a nest of cooling tubes has a greater capacity for absorbing heat, and actually does effect a greater transfer of heat per unit of cooling surface.

The rise in temperature of the circulating media as it progresses toward the discharge end of a nest of cooling tubes makes a greater heat head available in the vicinity of the inlet, or colder end of a nest, and, consequently, the colder end should be capable of condensing more steam than the warmer end of the nest. However, since the steam, or the like, to be condensed, is passed into the nest so as to be substantially equally distributed longitudinally, and the flow of gaseous media through the nest is radial, the same vacuum being maintained throughout, there is little tendency for redistribution, once the steam enters the nest.

Consequently, substantially equal quantities of steam are passed into substantially equal portions of the nest, with the result that condensation of the steam which passes into the colder end of the nest may be effected by only a portion of the cooling surface, while at the warmer end, the entire cooling surface may be required. A more economical arrangement can be produced by proportioning the amount of steam to the cooling surface in accordance with the capacity of the particular surface to effect condensation.

More particularly, therefore, an object of my invention is to provide for passing greater quantities of condensable media into the colder end of a nest of tubes, and to provide for so distributing the condensable media, longitudinally, that each transverse section of the nest shall be supplied with a quantity of condensable media which shall be proportionate to the capacity of the respective portion for effecting condensation.

Apparatus embodying the features of my invention is shown in the accompanying drawings in which:

Fig. 1 is an elevation of a radial flow condenser showing the upper half of the condenser in section;

Fig. 2 is a transverse section on the line II—II of Fig. 1;

Fig. 3 is a transverse section on the line III—III of Fig. 1;

Fig. 11 is an elevation of a turbine-condenser installation, in which the condenser and the lower portion of the turbine casing are in section, the turbine blading being removed for purposes of illustration; and, Fig. 12 is a section along the line XII—XII of Fig. 11.

Figure 4:
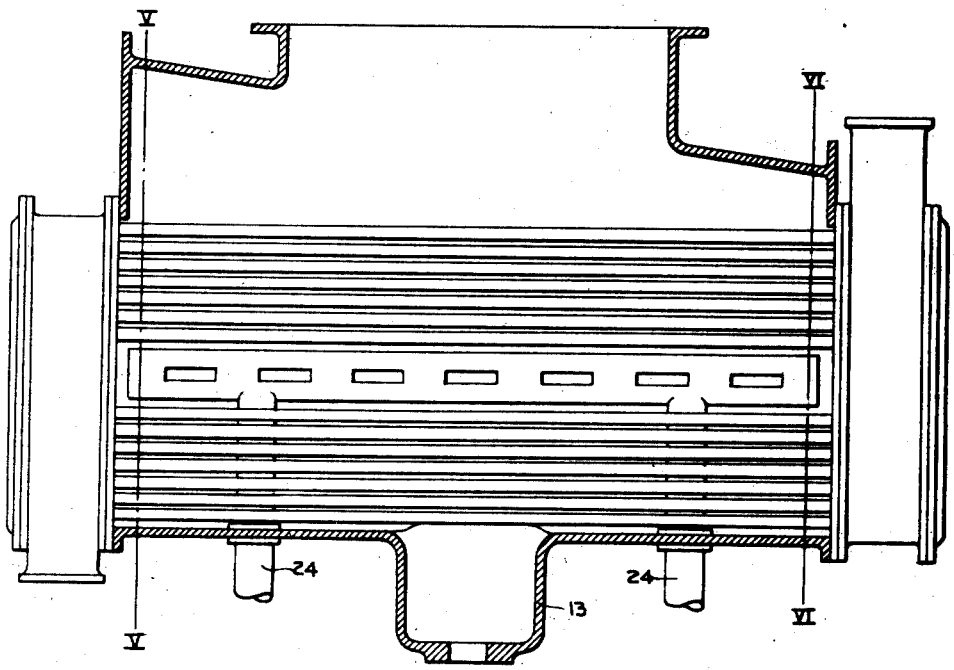
Fig. 4 is a longitudinal section of another form of radial flow condenser.

According to my invention, a radial flow condenser is provided with a shell in the form of a frustum of a cone, the inner conical surface serving to define the steam delivery space about the periphery of the nest. The larger end of the shell is disposed adjacent the inlet water box, and thus, it is assured that a greater quantity of steam will pass into the colder portion of the nest.

By virtue of the shape of the shell, the steam may be distributed longitudinally so as to pass precisely the correct amount of steam into each portion of the nest.

Referring now to the drawings for a better understanding of my invention, in Figs. 1, 2 and 3, I show a radial flow condenser 10, comprising a shell 11, having an inlet 12, and provided with a hotwell 13. The shell 11 is arranged in the form of a frustum of a right circular cone, the larger end of the shell being disposed adjacent to the inlet water box 14, while the discharge water box 16 is disposed adjacent the smaller end of the shell 11. The shell 11 is eccentrically disposed with respect to the nest of cooling tubes 17, as shown in Figs. 2 and 3, from which it will be clear that the steam delivery space 18 progressively diminishes longitudinally of the tube nest 17 in the direction of the discharge water box 16. This arrangement assures that the quantity of steam delivered to the periphery of the nest will be proportionate to the condensing capacity of the respective portions of the nest.

In the form shown, the tube sheets 19 are made the same size, and the respective ends of the shell carry inwardly projecting flanges 20 and 21 by which the shell is secured to the respective tube sheets. In this way, it is possible to secure the advantages incident to increasing the size of the shell without incurring the expense of providing larger tube sheets. The nest of tubes 17 and the centrally disposed air and non-condensable gas offtake 22 are of the standard and well-known construction, the non-condensable gases being removed, in this instance, through the inlet water box 14.

Figure 5:
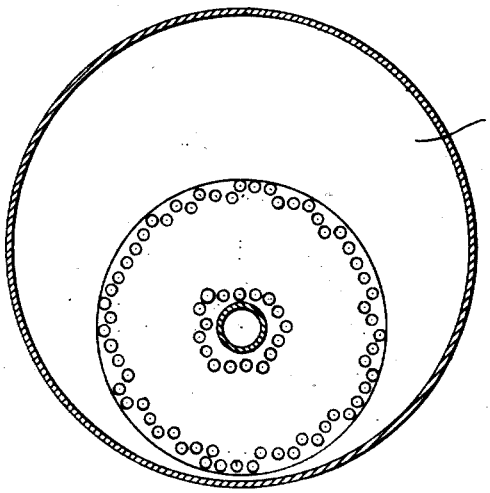
Fig. 5 is a section on the line V—V of Fig. 4.
Figure 6:
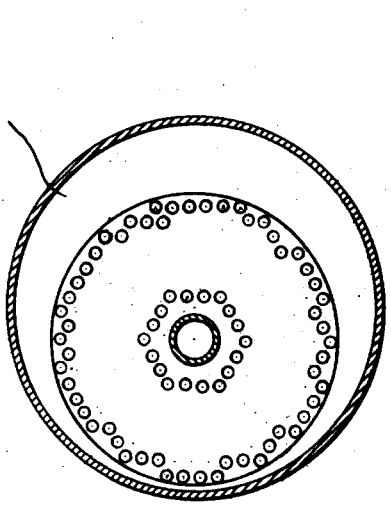
Fig. 6 is a section on the line VI—VI of Fig. 4.

In Figs. 4, 5 and 6, the structure is similar to that in Figs. 1, 2 and 3, with the exception that the shell is in the form of the frustum of an oblique cone, so as to provide a steam space 23 as shown in Figs. 5 and 6. In these views, the tube spacing and the arrangement of the air and non-condensable gas offtake 22 is of the standard and well-known form, the air and non-condensable gases being removed through the bottom of the shell by means of connections 24. Since, in this form of the invention, the bottom of the shell is substantially horizontal, the hotwell 13 is centrally disposed, although, of course, the location of this hotwell is not material to my invention.

From the description of Figs. 1 to 6, inclusive, it will be obvious that the only additional expense involved is that of increasing the size of the shell and that the other features of mechanical construction may be constructed as cheaply as any standard condenser. It will be understood, that the tube plates 19 may be made large enough so as to close the respective ends of the shell, thereby avoiding the need for the inwardly extending flanges 20 and 21 shown in Fig. 1.

Figure 7:
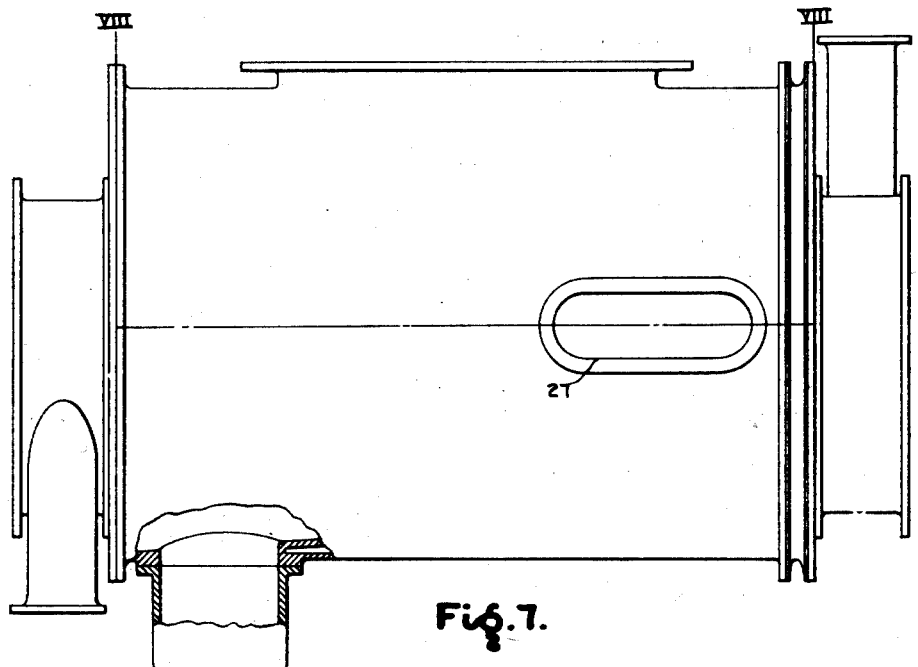
Fig. 7 is a longitudinal elevation of a radial flow condenser provided with auxiliary heat exchanging means.
Figure 8:
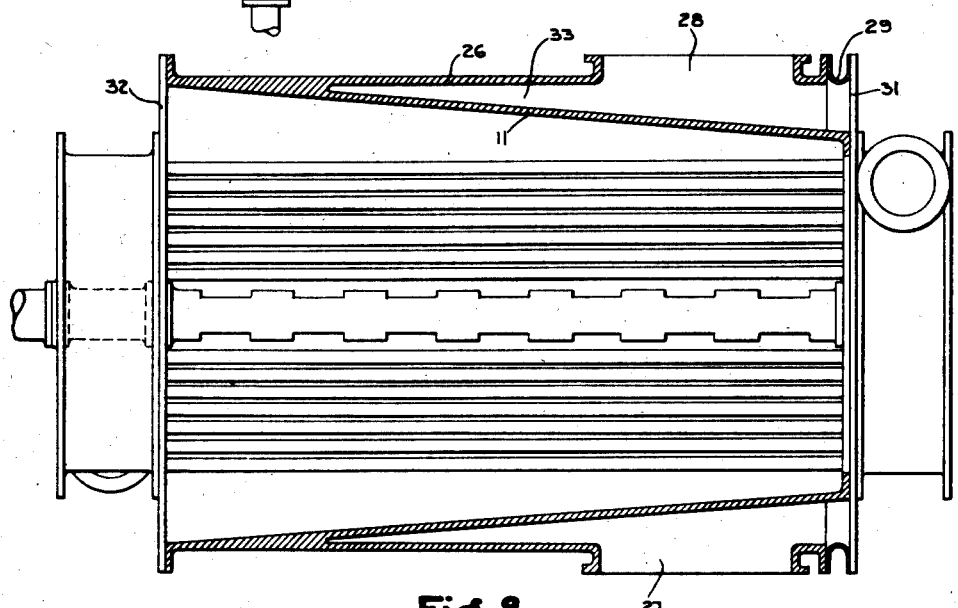
Fig. 8 is a section on the line VIII—VIII of Fig. 7.

In Figs. 7 and 8, I show a condenser of the type shown in Fig. 1, in which means are provided for utilizing the space about the smaller end of the shell 11. In this form of the invention the shell 11 is enclosed by a cylindrical, or outer shell piece 26, which is provided with inlet and outlet connections 27 and 28, respectively. The outer shell 26 may be made integral with the inner shell 11 at the large end, as shown, and the other end of the shell 26 may be secured to an expansion joint 29, which is connected to the tube sheet 31, so as to allow for unequal expansion between the shells 26 and 11. In this form of the invention, it will be noted that the tube sheets 31 and 32, respectively, extend to the outer diameter of the shell 26, and that the tube sheet 31, together with the shell members 11 and 26, provide a passage or duct 33, which may be used for cooling air, or the like, for a generator or for some similar purpose. This provides a very convenient means for cooling generator air and, at the same time, it provides a very efficient way of utilizing the space provided at the smaller end of the shell 11. Obviously the air or other medium to be cooled may be passed in either direction through the passage 33.

Figure 9:
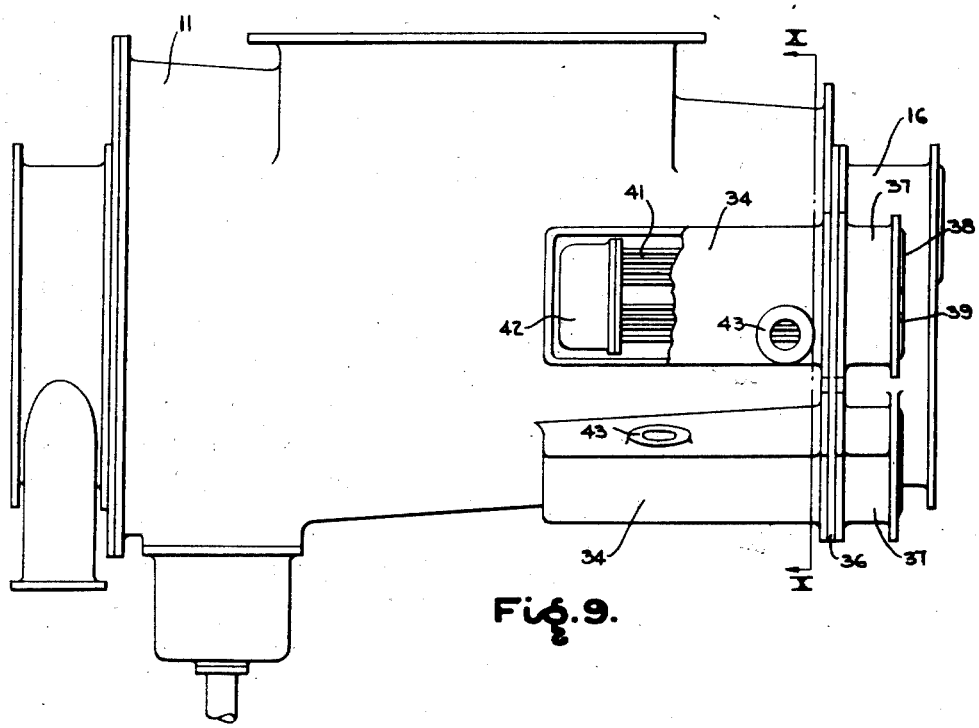
Fig. 9 is a longitudinal elevation of a further modified form of radial flow condenser.
Figure 10:
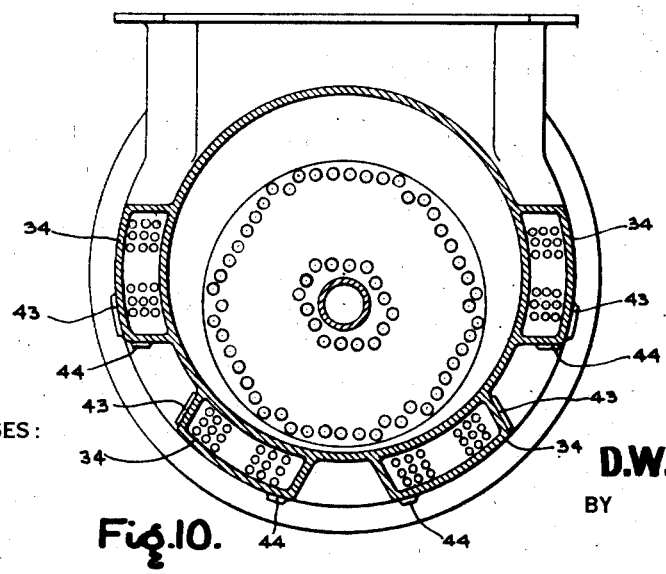
Fig. 10 is a section on the line X—X of Fig. 9.

In Figs. 9 and 10, I show a condenser of the type shown in Figs. 1, 2 and 3 in which the available space at the small end of the shell 11 is partially occupied by a series of heat exchangers 34. In the form shown, the shells of these heat exchangers are cast integral with the shell 11, but obviously the shells may be made separate and bolted on to the shell 11 and to the associated tube sheet 36 in any approved manner. The tube sheet 36 for the smaller end of the shell 11 also serves as a tube sheet for the heating elements of the various heaters 34.

The respective heaters 34 are of the movable header type, and are provided with inlet and discharge water boxes 37, which, in this instance, are made integral with the discharge water box 16, but are provided with independent inlet and discharge connections 38 and 39, respectively. The heating elements comprise a nest of tubes 41, which are arranged to pass the circulating media from the inlet water boxes 37 to the return water boxes 42, from which the water is passed to the water boxes 37. The shells of the heaters 34 are provided with inlet connections 43 and discharge connections, or drains 44 which communicate with the steam space.

While the heaters 34 are shown as of the movable header type, the space at this end of the shell is adequate to accommodate heaters having fixed tube sheets and bowed tubes, to allow for expansion and contraction, or, if desired, the return water box 42 may be dispensed with and the heaters provided with hairpin or loop tubes.

In Fig. 11 I show a bleeder turbine indicated generally at 50, comprising a casing 51 which encloses the turbine rotor 52. The exhaust chamber 53 of the turbine is connected to the inlet 54 of the condenser 55. The condenser 55 is similar in all respects to that described with reference to Fig. 9, with the exception that in this instance only two of the heaters 34 are shown instead of four, as in Fig. 9.

The blading of the turbine rotor 52 is shown as removed, in order to more clearly disclose the annular ports 56 and 57 through which motive fluid is bled into the chambers 58 and 59, respectively, for regenerative heating, or the like. Preferably, the chamber 58 is connected by a conduit 61 with the steam space of the heater 34 shown on the left in Fig. 11 and the chamber 59 is connected by a conduit 62 with the steam space of the heater 34 shown on the right in Fig. 11. The arrangement of the chambers 58 and 59 with respect to the condenser inlet 54 is clearly shown in Fig. 12 from which it will be quite obvious that this arrangement provides a very simple and efficient means for enclosing the bleeding connections and thus, for removing such piping from the exterior of the installation. While I have shown but two of the heaters 34 and two bleeding connections 61 and 62 in Fig. 11, it will be understood that this is for purposes of illustration only, and that any suitable number of such heaters together with their respective bleeding connections may be arranged as shown in this view.

It will thus be seen that I have provided a simple, and yet very efficient means for producing the proper longitudinal distribution of steam to a condenser of the type described, and that by proportioning the shell with respect to the conditions under which the condenser is expected to operate, that is, by considering the temperature of the available cooling water and also the vacuum required, the steam delivery space may be so arranged as to deliver precisely the correct amount of steam to each longitudinal portion of the nest, so that every bit of the condensing capacity of the nest is utilized. Further, it will be noted that the steam is correctly distributed longitudinally with respect to the entire nest, and that the effects of improper longitudinal steam distribution are not merely reduced by reducing the longitudinal portion through which unequal distribution may occur.

Furthermore, in modern power installations, a condenser is often placed so close to a turbine that a bleeding connection from the turbine must be passed through the steam space of the condenser. By using the conical shell of the type described, it is possible to place the condenser very close to the turbine, and to pass the bleeding connections inside of the condenser shell to the respective heaters and thus, to remove some of the piping from the exterior of the installation. Also, in some cases where a stand-by turbine unit is floated on the line, a relatively small amount of condensing is required for long periods of time. This may be taken care of, with a minimum expenditure of power, by operating one, or more, of the heaters 34 as a condenser.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:—

1. A surface condenser comprising a frusto-conical shell, a tube nest embraced within the shell, and other heat transfer means included in a cylindrical projection of the larger end of the shell.

2. A surface condenser comprising a frusto-conical shell, a tube nest embraced within the shell, and heat transfer means arranged around the smaller end of the shell and within the cylindrical projection of the larger end of the shell.

3. The combination with a condenser having a tapered shell, of one or more independent heat exchangers disposed about the small end of the shell.

4. The combination with a condenser having a substantially frusto-conical shell, of one, or more, independent heat exchangers disposed about the small end of the shell, and a common tube sheet for the condenser and for said one, or more, heat exchangers.

5. The combination according to claim 1, in which the shell, or shells, for the independent heat exchanger, or exchangers, are integral with the condenser shell.

6. The combination with a surface condenser comprising a shell having an inlet, a nest of heat transfer tubes within the shell and one or more heat exchangers disposed contiguous to the outer surface of the shell, of means within the shell providing a passage, or passages from said inlet to said one or more heat exchangers.

In testimony whereof, I have hereunto subscribed my name this 19th day of September, 1927.

DAVID W. R. MORGAN.